(12) United States Patent
Wurmfeld

(10) Patent No.: US 11,587,064 B2
(45) Date of Patent: *Feb. 21, 2023

(54) SYSTEMS AND METHODS FOR VALIDATING CUSTOMER INTERACTIONS

(71) Applicant: Capital One Services, LLC, McLean, VA (US)

(72) Inventor: David Kelly Wurmfeld, Fairfax, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/539,350

(22) Filed: Dec. 1, 2021

(65) Prior Publication Data
US 2022/0414640 A1     Dec. 29, 2022

Related U.S. Application Data

(63) Continuation of application No. 17/358,762, filed on Jun. 25, 2021, now Pat. No. 11,222,326.

(51) Int. Cl.
*G06Q 20/32* (2012.01)
*G06Q 20/40* (2012.01)
(Continued)

(52) U.S. Cl.
CPC ......... *G06Q 20/3274* (2013.01); *G06F 21/31* (2013.01); *G06K 19/06037* (2013.01);
(Continued)

(58) Field of Classification Search
None
See application file for complete search history.

(56) References Cited

U.S. PATENT DOCUMENTS 8,985,437 B2   3/2015   Burkhart et al.
9,286,560 B2   3/2016   Burkhart et al.
(Continued)

OTHER PUBLICATIONS

International Search Report and Written Opinion in related International Application No. PCT/US22/33566, dated Sep. 8, 2022.
International Search Report and Written Opinion in related International Application No. PCT/US2022/072923 dated Sep. 22, 2022.

*Primary Examiner* — Kristy A Haupt
(74) *Attorney, Agent, or Firm* — Troutman Pepper Hamilton Sanders LLP; Christopher J. Forstner; John A. Morrissett

(57) ABSTRACT

A method may include generating, by a computing device, a first dynamic QR code comprising a plurality of QR code frames, each QR code frame transmitted at a first frequency, the plurality of QR code frames comprising non-viable QR code frame(s) and at least one viable QR code frame. The method may include displaying, by the computing device, the first dynamic QR code, the at least one viable QR code frame displayed at a first time. The method may include transmitting, by the computing device, a first pulse to a user device. The method may include capturing, by the user device at the first time and in response to receiving the first pulse, the at least one viable QR code frame. The method may include generating and displaying, by the user device, a second dynamic QR code, causing the computing device to complete a requested transaction.

20 Claims, 6 Drawing Sheets

(51) Int. Cl.
*G06Q 20/20* (2012.01)
*G06Q 20/04* (2012.01)
*H04W 76/10* (2018.01)
*G06K 19/06* (2006.01)
*H04W 12/06* (2021.01)
*G06Q 40/02* (2012.01)
*G06F 21/31* (2013.01)
*G06Q 20/18* (2012.01)
*G06K 1/12* (2006.01)
*G06Q 20/10* (2012.01)

(52) U.S. Cl.
CPC ..... *G06K 19/06112* (2013.01); *G06Q 20/042* (2013.01); *G06Q 20/204* (2013.01); *G06Q 20/208* (2013.01); *G06Q 20/3272* (2013.01); *G06Q 20/3276* (2013.01); *G06Q 20/3278* (2013.01); *G06Q 20/40145* (2013.01); *G06Q 40/02* (2013.01); *H04W 12/06* (2013.01); *H04W 76/10* (2018.02); *G06K 1/121* (2013.01); *G06Q 20/1085* (2013.01); *G06Q 20/18* (2013.01); *G06Q 20/3223* (2013.01)

(56) References Cited

U.S. PATENT DOCUMENTS

| | | |
|---|---|---|
| 9,892,116 B2 | 2/2018 | Metso |
| 10,032,057 B2 | 7/2018 | Burkhart et al. |
| 10,360,425 B2 | 7/2019 | Burkhart et al. |
| 10,735,436 B1 | 8/2020 | Chernilovsky et al. |
| 10,769,625 B2 | 9/2020 | Pandiarajan et al. |
| 10,867,147 B2 | 12/2020 | Burkhart et al. |
| 11,222,326 B1 * | 1/2022 | Wurmfeld ............ G06Q 20/325 |
| 2009/0213425 A1 | 8/2009 | Oishi |
| 2013/0085968 A1 | 4/2013 | Schultz et al. |
| 2013/0306721 A1 | 11/2013 | Meng |
| 2014/0231504 A1 | 8/2014 | DeRoos et al. |
| 2015/0006382 A1 | 1/2015 | Scipioni |
| 2015/0244715 A1 | 8/2015 | Narayan et al. |
| 2017/0017866 A1 | 1/2017 | Nithianand et al. |
| 2018/0096155 A1 | 4/2018 | Ryu et al. |
| 2020/0380493 A1 | 12/2020 | Morales et al. |
| 2021/0142314 A1 | 5/2021 | Pharr et al. |

* cited by examiner

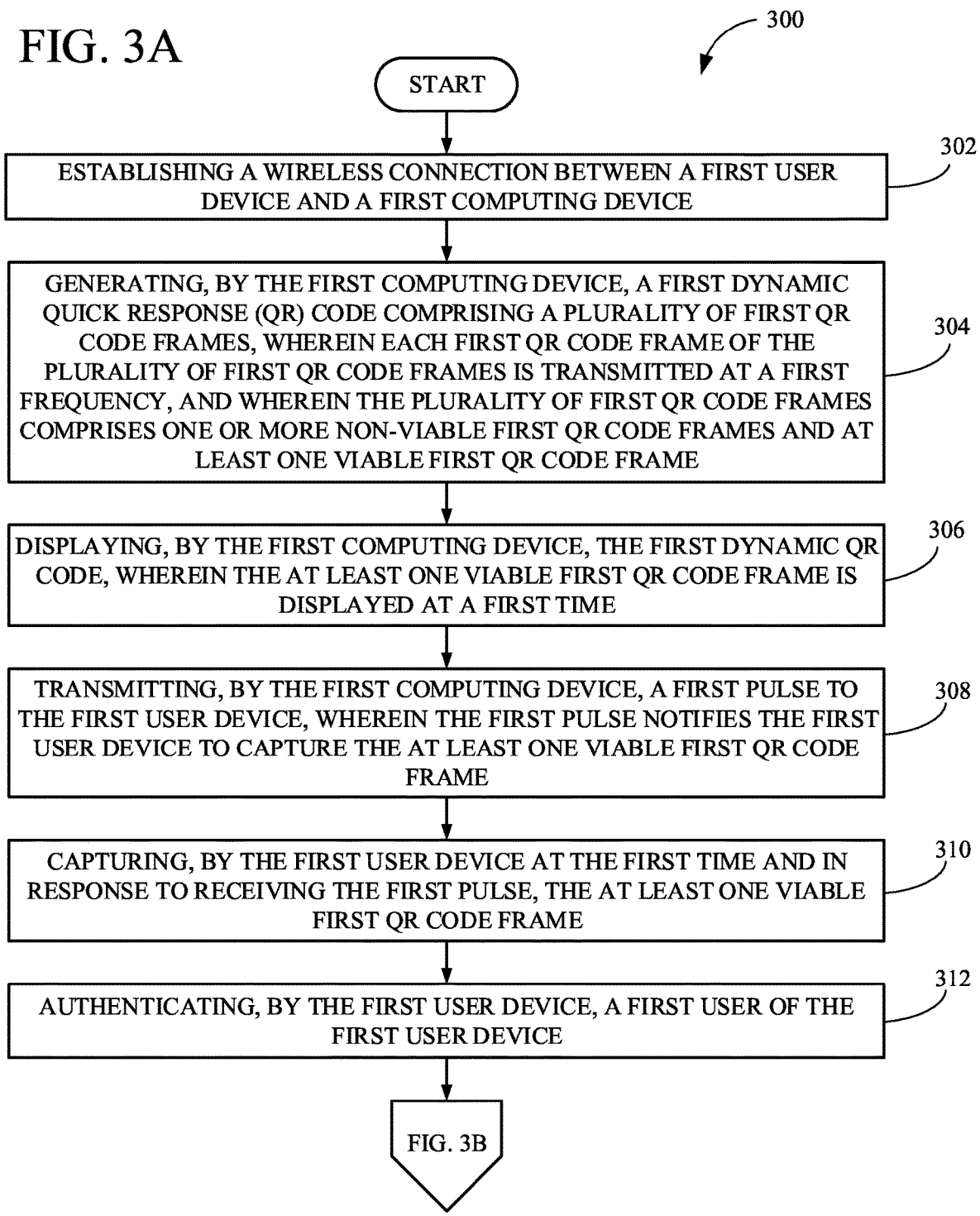

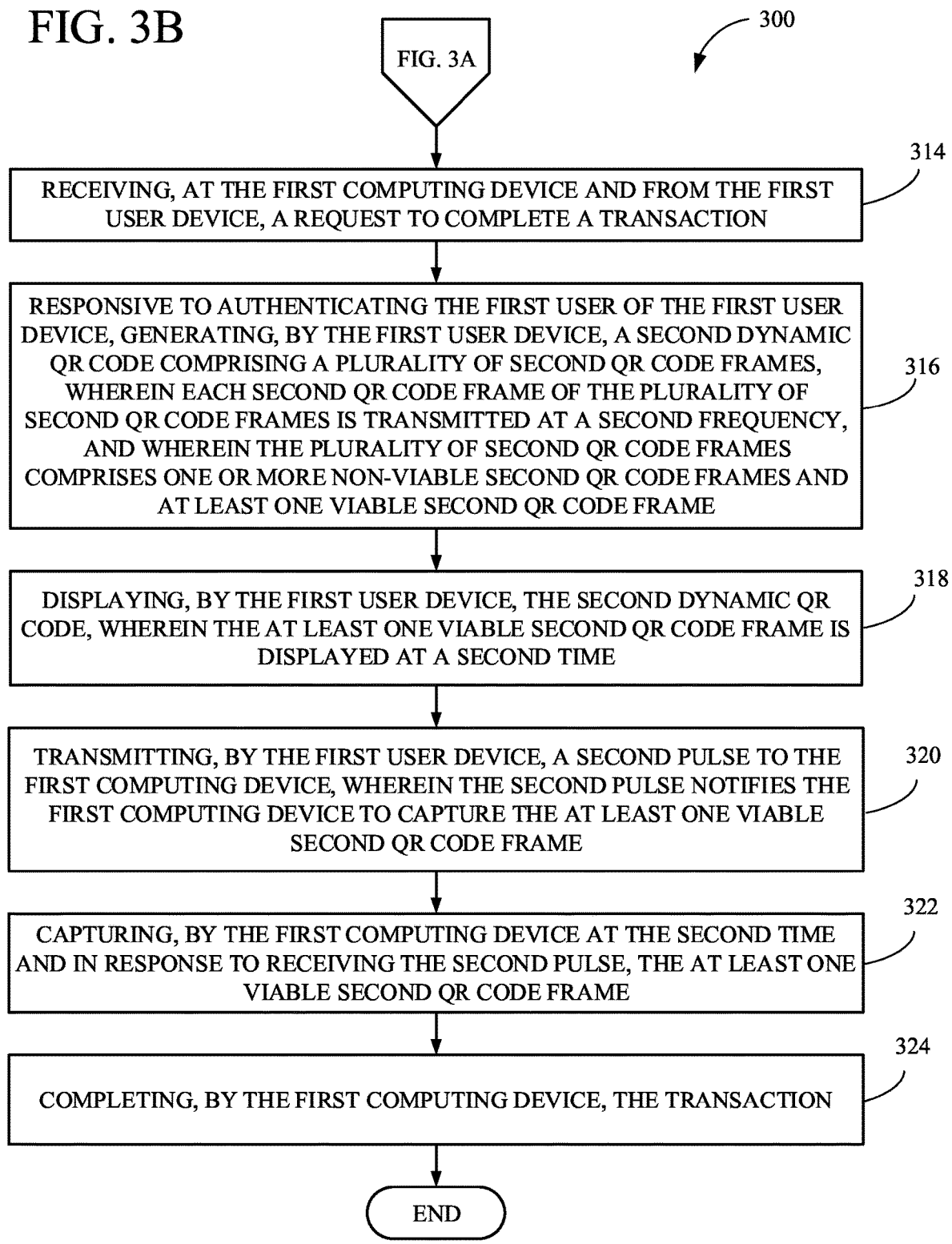

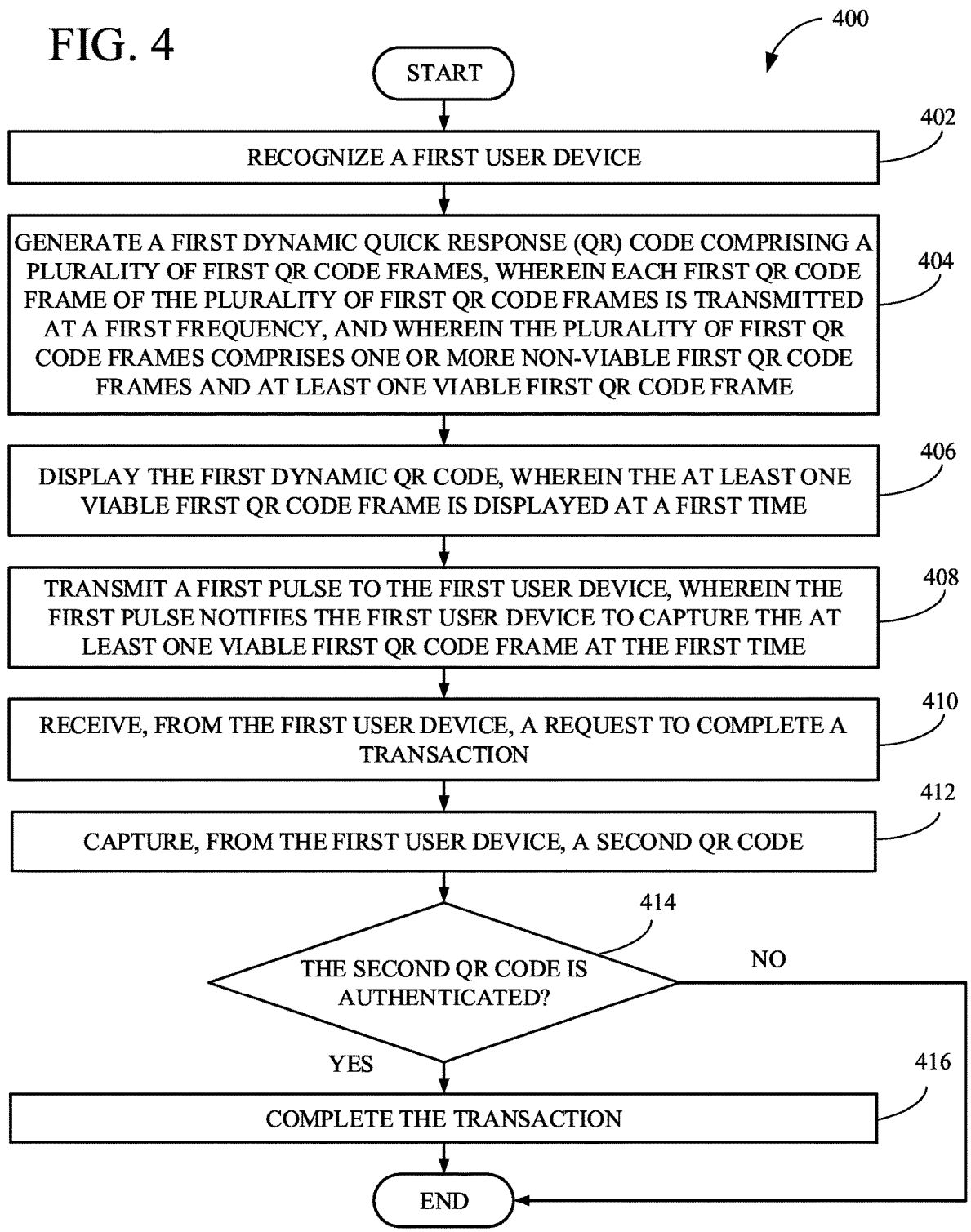

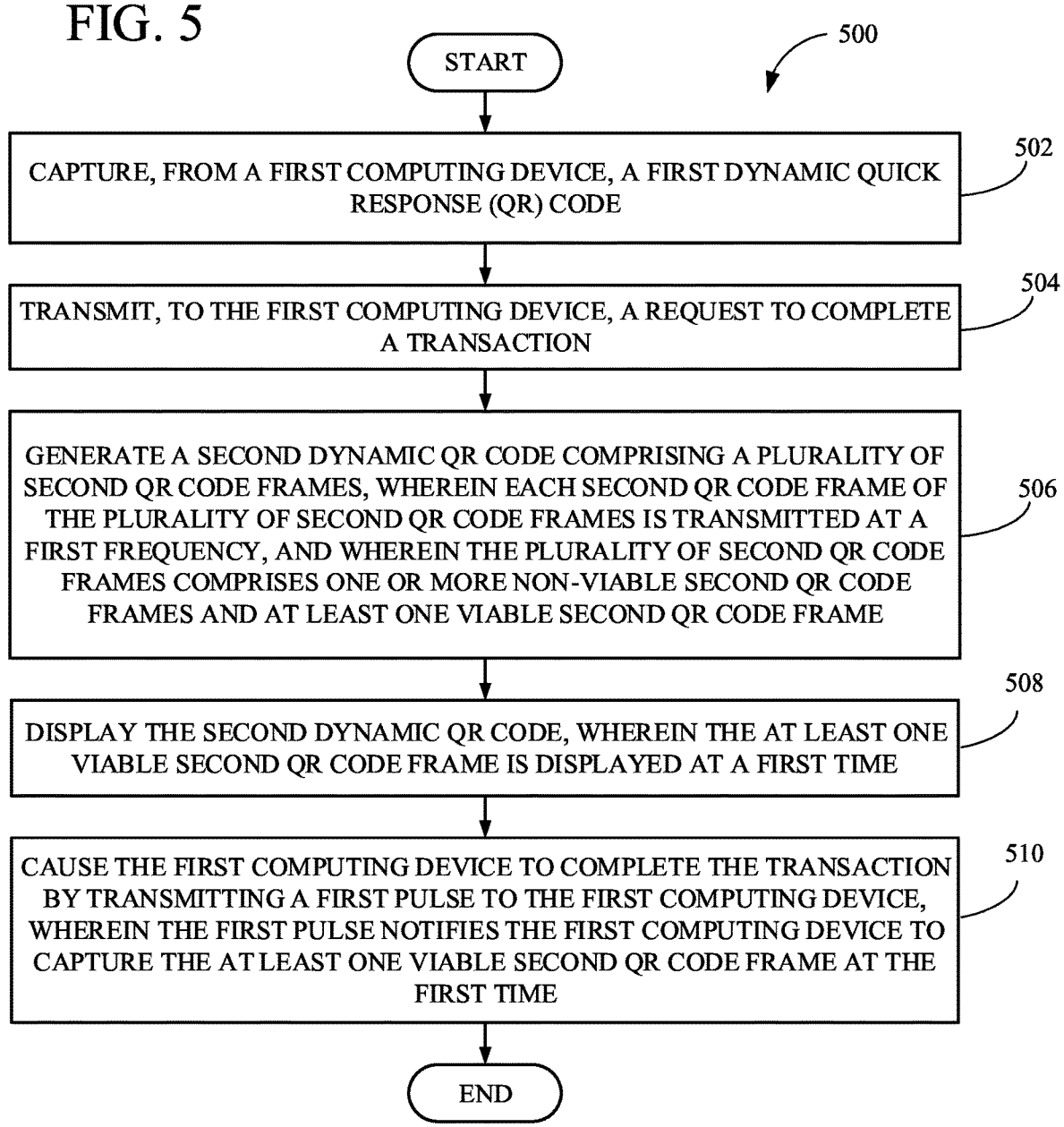

SYSTEMS AND METHODS FOR VALIDATING CUSTOMER INTERACTIONS

CROSS REFERENCE TO RELATED APPLICATIONS

This application is a continuation of, and claims priority under 35 U.S.C. § 120 to, U.S. patent application Ser. No. 17/358,762, filed Jun. 25, 2021, the entire contents of which is fully incorporated herein by reference.

FIELD

The disclosed technology relates to systems and methods for validating customer interactions, and more particularly for generating a dynamic quick response (QR) code to iteratively validate customer interactions.

BACKGROUND

Many traditional systems and methods utilize QR codes or other two-dimensional encoded graphics to initiate and/or authenticate interactions between customers and financial transaction terminals, such as ATMs and other kiosks. Traditional graphics used in these circumstances can be easily intercepted by unintended actors, such as people standing in line behind a customer at an ATM, thereby leading to increased financial fraud.

Accordingly, there is a need for improved systems and methods that provide for iterative validation of customer interactions by way of a dynamic QR code. Embodiments of the present disclosure are directed to this and other considerations.

SUMMARY

Disclosed embodiments provide systems and methods for iteratively validating customer interactions using a dynamic QR code.

Consistent with the disclosed embodiments, a method for validating customer interactions may include establishing a wireless connection between a first user device (e.g., a mobile phone) and a first computing device (e.g., a cashier's check kiosk). The method may include generating, by the first computing device, a first dynamic QR code comprising a plurality of first QR code frames, wherein each first QR code frame of the plurality of first QR code frames is transmitted at a first frequency, and wherein the plurality of first QR code frames comprises one or more non-viable first QR code frames and at least one viable first QR code frame. The method may include displaying, by the first computing device, the first dynamic QR code, wherein the at least one viable first QR code frame is displayed at a first time. The method may include transmitting, by the first computing device, a first pulse (e.g., a wireless signal, infrared light, a strobe, etc.) to the first user device, wherein the first pulse notifies the first user device to capture the at least one viable first QR code frame. The method may include capturing, by the first user device at the first time and in response to receiving the first pulse, the at least one viable first QR code frame. The method may include authenticating, by the first user device, a first user of the first user device. The method may include receiving, at the first computing device and from the first user device, a request to complete a transaction. The method may include generating, in response to authenticating the first user of the first user device and by the first user device, a second dynamic QR code comprising a plurality of second QR code frames, wherein each second QR code frame of the plurality of second QR code frames is transmitted at a second frequency, and wherein the plurality of second QR code frames comprises one or more non-viable second QR code frames and at least one viable second QR code frame. The method may include displaying, by the first user device, the second dynamic QR code, wherein the at least one viable second QR code frame is displayed at a second time. The method may include transmitting, by the first user device, a second pulse to the first computing device, wherein the second pulse notifies the first computing device to capture the at least one viable second QR code frame. The method may include capturing, by the first computing device at the second time and in response to receiving the second pulse, the at least one viable second QR code frame. The method may include completing, by the first computing device, the transaction. This embodiment provides the added benefit of significantly reducing any potentially fraudulent activity by iteratively validating both the user device and the user associated with the user device prior to completing the requested transaction.

In another embodiment, a system may include one or more processors and a memory in communication with the one or more processors and storing instructions, that when executed by the one or more processors, are configured to cause the system to perform a method for validating customer interactions. The system may recognize a first user device. The system may generate a first dynamic QR code comprising a plurality of first QR code frames, wherein each first QR code frame of the plurality of first QR code frames is transmitted at a first frequency, and wherein the plurality of first QR code frames comprises one or more non-viable first QR code frames and at least one viable first QR code frame. The system may display the first dynamic QR code, wherein the at least one viable first QR code frame is displayed at a first time. The system may then transmit a first pulse to the first user device, wherein the first pulse notifies the first user device to capture the at least one viable first QR code frame at the first time. The system may receive, from the first user device, a request to complete a transaction. The system may capture, from the first user device, a second QR code. The system may then determine whether the second QR code is authenticated. Responsive to determining that the second QR code is authenticated, the system may complete the transaction.

In another embodiment, a system may include one or more processors and a memory in communication with the one or more processors and storing instructions, that when executed by the one or more processors, are configured to cause the system to perform a method for validating customer interactions. The system may capture, from a first computing device, a first dynamic QR code. The system may transmit, to the first computing device, a request to complete a transaction. The system may generate a second dynamic QR code comprising a plurality of second QR code frames, wherein each second QR code frame of the plurality of second QR code frames is transmitted at a first frequency, and wherein the plurality of second QR code frames comprises one or more non-viable second QR code frames and at least one viable second QR code frame. The system may display the second dynamic QR code, wherein the at least one viable second QR code frame is displayed at a first time. The system may then cause the first computing device to complete the transaction by transmitting a first pulse to the first computing device, wherein the first pulse notifies the first computing device to capture the at least one viable second QR code frame at the first time.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings:

FIGS. 3A-3B are a flowchart of a method for validating customer interactions, in accordance with some embodiments of the present disclosure;

FIG. 4 is a flowchart of a method for validating customer interactions, in accordance with some embodiments of the present disclosure; and FIG. 5 is a flowchart of a method for validating customer interactions, in accordance with some embodiments of the present disclosure.

DETAILED DESCRIPTION

Figure 1:
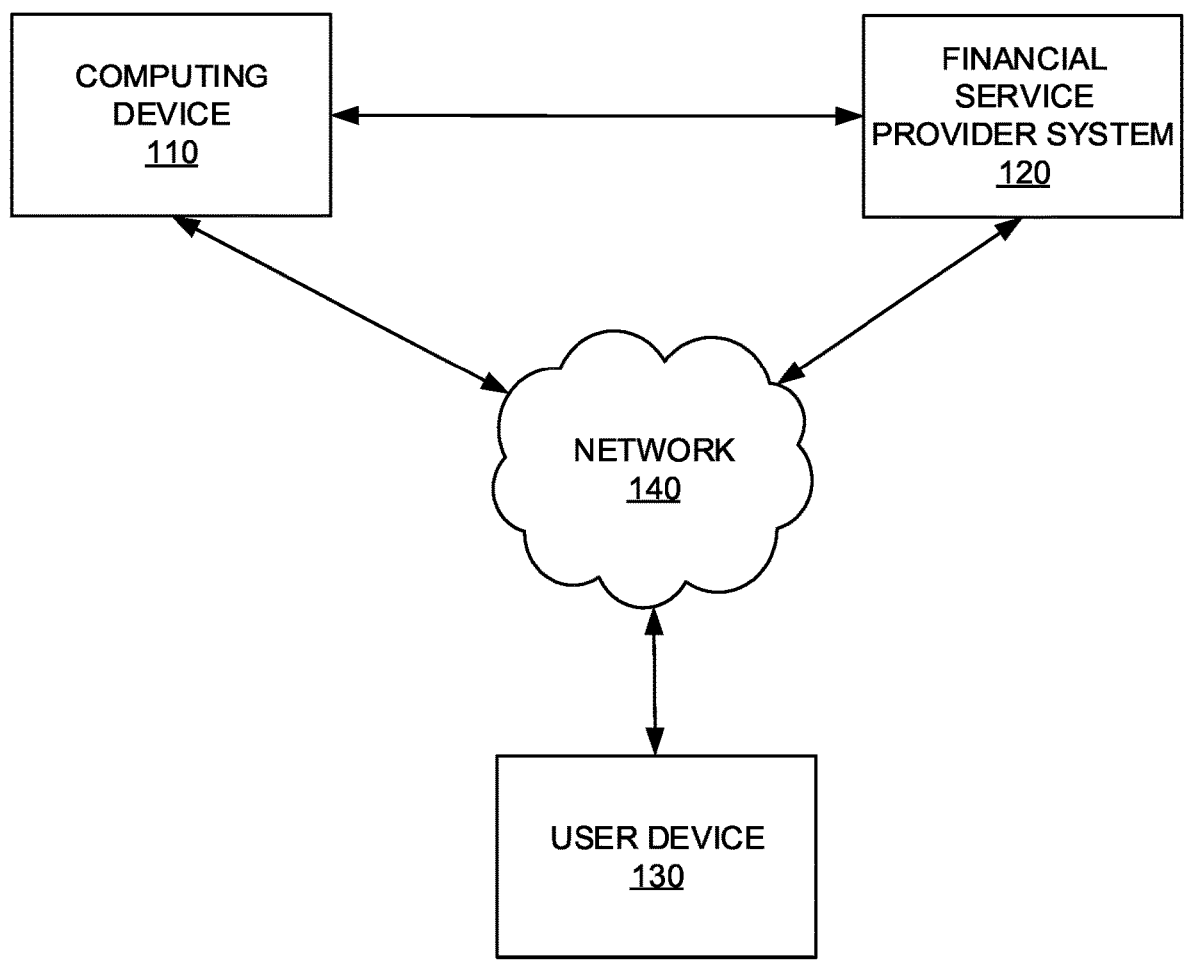
FIG. 1 is a block diagram of an example system environment that may be used to implement one or more embodiments of the present disclosure.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

By way of introduction, aspects discussed herein may relate to systems and methods for validating customer interactions. For example, some embodiments describe using a dynamic QR code at a financial transaction kiosk and on an individual user device to iteratively validate interactions between the kiosk and the user associated with the user device. These provide advantages over other systems and methods by making it so unintended actors may not intercept financial transactions. As such, the following discussion describes several exemplary systems and methods for iteratively validating customer interactions using a dynamic QR code.

These exemplary systems and methods specifically provide improvements to the functioning of computing devices, such as kiosks, ATMs, and mobile devices, by significantly increasing the reliability of real-time, user-specific authentication. For example, a standalone financial kiosk, through generating and displaying a dynamic QR code with rapidly changing QR code frames while transmitting a pulse (described below) at a time that corresponds to when a correct QR code frame of the multiple QR code frames is displayed, may significantly reduce, if not eliminate, fraudulent activity occurring during certain types of transactions. The disclosed dynamic QR codes may be designed such that they require a user to not only capture the correct QR code frame at a precisely defined time, but also from a specific angle, and from a close enough distance to maintain a sufficient wireless connection between the kiosk and the user's mobile device.

For similar reasons, the following exemplary systems and methods also provide improvements to the networking and communication between personal computing devices and other computing devices. By securely and efficiently enabling users to connect and authenticate with another stationary computing device, such as a kiosk, users can verify they are present at a brick-and-mortar location allowing the users to conduct high value transactions via a low-risk process without the need for merchant or human intervention. This may result in decreased fraud and increased customer trust.

Reference will now be made in detail to example embodiments of the disclosed technology that are illustrated in the accompanying drawings and disclosed herein. Wherever convenient, the same reference numbers will be used throughout the drawings to refer to the same or like parts.

FIG. 1 is a diagram of an example system environment that may be used to implement one or more embodiments of the present disclosure. The components and arrangements shown in FIG. 1 are not intended to limit the disclosed embodiments as the components used to implement the disclosed processes and features may vary.

In accordance with disclosed embodiments, system 100 may include a computing device 110 (as will be discussed in more detail below with reference to FIG. 2) that may be in communication (either directly or via a network 140) with a financial service provider system 120. System 100 may also include a user device 130 that may be in communication (either directly or via network 140) with each other, financial service provider system 120, and/or computing device 110.

In certain embodiments, financial service provider system 120 may store and/or have access to detailed customer information, such as account information. Financial service provider system 120 may communicate with computing device 110 to correlate compiled data, analyze the compiled data, arrange the compiled data, generate derived data based on the compiled data, and store the compiled and derived data in a database. Financial service provider system 120 may also communicate with computing device 110 and/or user device 130 to provide one or more graphical user interface (GUI) displays to enable a user to input data, search for data, transfer data, and transmit and receive payments.

User device 130 may be a mobile computing device (e.g., a smart phone, tablet computer, smart wearable device, portable laptop computer, voice command device, wearable augmented reality device, or other mobile computing device), a stationary device (e.g., desktop computer), or any other device capable of communicating with network 140 and ultimately communicating with one or more components of system 100. In some embodiments, user device 130 may include or incorporate electronic communication devices for hearing or vision impaired users. User device 130 may be operated by a user, which may include individuals such as, for example, subscribers, clients, prospective clients, or customers of an entity associated with an organization, such as individuals who have obtained, will obtain, or may obtain a product, service, or consultation from an entity associated with system 100. According to some embodiments, user device 130 may include an environmental sensor for obtaining audio or visual data, such as a microphone and/or digital camera, a geographic location sensor for determining the location of the device, an input/output ("I/O") device such as a transceiver for sending and receiving data, a display for displaying digital images, one or more processors including a sentiment depiction processor, and a memory in communication with the one or more processors.

Network 140 may be of any suitable type, including individual connections via the internet such as cellular or WiFi™ networks. In some embodiments, network 140 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Figure 2:
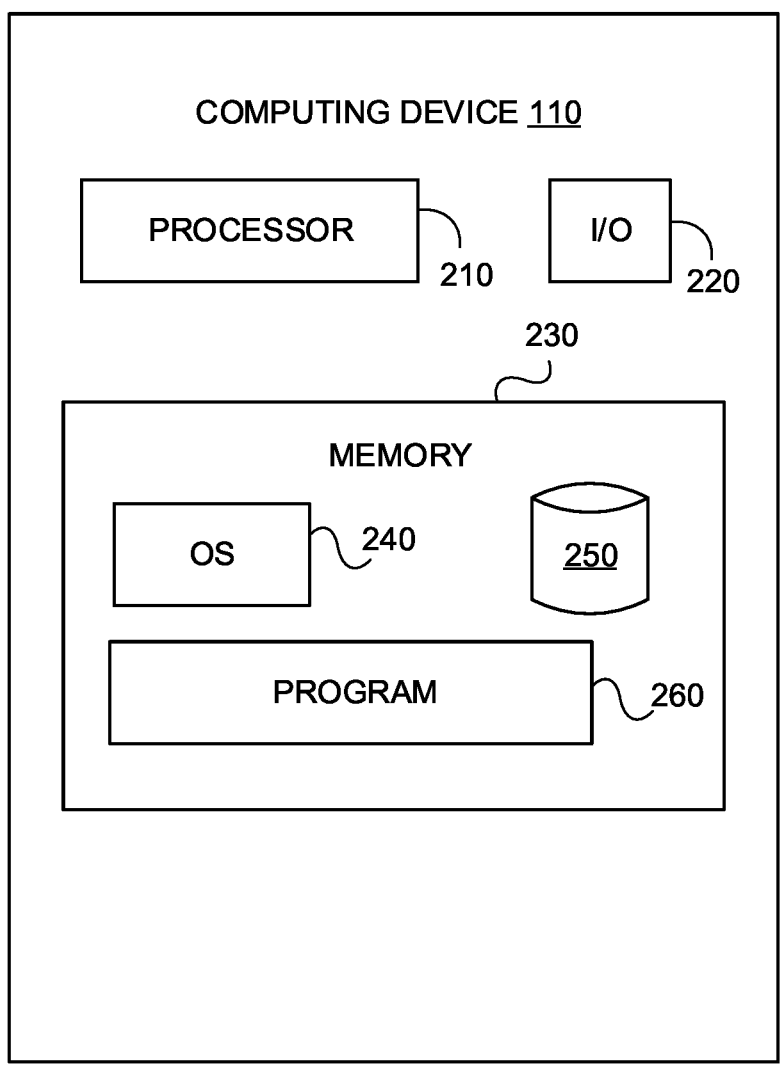
FIG. 2 is a component diagram of a computing device in accordance with some embodiments of the present disclosure.

An example embodiment of computing device 110 is shown in more detail in FIG. 2. As shown, computing device 110 may include a processor 210, an I/O device 220, a memory 230 containing an operating system ("OS") 240, a database 250, and a program 260.

Computing device 110 may be a single server or may be configured as a distributed computer system including multiple servers or computers that interoperate to perform one or more of the processes and functionalities associated with the disclosed embodiments. In some embodiments, computing device 110 may further include a peripheral interface, a transceiver, a mobile network interface in communication with processor 210, a bus configured to facilitate communication between the various components of computing device 110, and a power source configured to power one or more components of computing device 110. A peripheral interface may include the hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, an NFC port, another like communication interface, or any combination thereof.

In some embodiments, a transceiver may be configured to communicate with compatible devices and ID tags when they are within a predetermined range. A transceiver may be compatible with one or more of: RFID, NFC, Bluetooth™, low-energy Bluetooth™ (BLE), WiFi™, ZigBee™, ABC protocols or similar technologies.

A mobile network interface may provide access to a cellular network, the Internet, or another wide-area network. In some embodiments, a mobile network interface may include hardware, firmware, and/or software that allows processor 210 to communicate with other devices via wired or wireless networks, whether local or wide area, private or public, as known in the art. A power source may be configured to provide an appropriate alternating current (AC) or direct current (DC) to power components.

Processor 210 may include one or more of a microprocessor, microcontroller, digital signal processor, co-processor or the like or combinations thereof capable of executing stored instructions and operating upon stored data. Memory 230 may include, in some implementations, one or more suitable types of memory (e.g., volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like) for storing files, including an operating system, application programs (including, e.g., a web browser application, a widget or gadget engine, or other applications, as necessary), executable instructions, and data. In one embodiment, the processing techniques described herein are implemented as a combination of executable instructions and data within memory 230.

Processor 210 may be one or more known processing devices, such as a microprocessor from the Pentium™ family manufactured by Intel™ or the Turion™ family manufactured by AMD™. Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Computing device 110 may include one or more storage devices configured to store information used by processor 210 (or other components) to perform certain functions related to the disclosed embodiments. In one example, computing device 110 may include memory 230 that includes instructions to enable processor 210 to execute one or more applications, such as server applications, network communication processes, and any other type of application or software known to be available on computer systems. Alternatively, the instructions, application programs, etc., may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, computing device 110 may include memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, computing device 110 may include memory 230 that may include one or more programs 260 to perform one or more functions of the disclosed embodiments. Moreover, processor 210 may execute one or more programs 260 located remotely from computing device 110. For example, computing device 110 may access one or more remote programs 260, that, when executed, perform functions related to disclosed embodiments.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational databases. Memory 230 may include software components that, when executed by processor 210, perform one or more processes consistent with the disclosed embodiments. In some embodiments, memory 230 may include database 250 for storing related data to enable computing device 110 to perform one or more of the processes and functionalities associated with the disclosed embodiments.

Computing device 110 may also be communicatively connected to one or more memory devices (e.g., databases (not shown)) locally or through a network. The remote memory devices may be configured to store information and may be accessed and/or managed by computing device 110. By way of example, the remote memory devices may be document management systems, Microsoft™ SQL database, SharePoint™ databases, Oracle™ databases, Sybase™ databases, or other relational databases. Systems and methods consistent with disclosed embodiments, however, are not limited to separate databases or even to the use of a database.

Computing device 110 may also include one or more I/O devices 220 that may include one or more interfaces for receiving signals or input from devices and providing signals or output to one or more devices that allow data to be received and/or transmitted by computing device 110. For example, computing device 110 may include interface components, which may provide interfaces to one or more input devices, such as one or more keyboards, mouse devices, touch screens, track pads, trackballs, scroll wheels, digital cameras, microphones, sensors, and the like, that enable computing device 110 to receive data from one or more users (such as via user device 130).

In example embodiments of the disclosed technology, computing device 110 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While computing device 110 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations may include a greater or lesser number of components than those illustrated.

FIGS. 3A-3B show a flowchart of a method 300 for validating customer interactions. Method 300 may be performed by computing device 110, financial service provider system 120, and/or user device 130.

Starting with FIG. 3A, in block 302, the system (e.g., system 100) may establish a wireless connection (e.g., via network 140) between a first user device (e.g., user device 130) and a first computing device (e.g., computing device 110). For example, the first user device and the first computing device may both be connected to a wireless connection associated with a merchant while in a merchant premises. Establishing a wireless connection between the first user device and the first computing device may not only allow for initiation of the first computing device (e.g., "waking up" a stationary kiosk located within a merchant premises), but may also allow the first user device and first computing device to maintain a sufficient enough connection throughout a transaction such that authentication of a user of the first user device may be maintained. As the strength of the wireless connection may weaken the farther the first user device is away from the first computing device, any unintended actors (e.g., persons standing across the room from the kiosk in the merchant premises) may have difficulty maintaining a sufficient enough connection to conduct any type of fraudulent activity associated with a given transaction.

In block 304, the system (e.g., system 100) may generate, by the first computing device, a first dynamic QR code comprising a plurality of first QR code frames, wherein each first QR code frame of the plurality of first QR code frames is transmitted at a first frequency, and wherein the plurality of first QR code frames comprises one or more non-viable first QR code frames and at least one viable first QR code frame. The first dynamic QR code may be generated in any color and may comprise any square number of individual blocks. For example, the first dynamic QR code may be generated in the shape of a square comprising, e.g., 100×100 individual small blocks. The greater the number of individual small blocks comprising the first dynamic QR code, the more difficult it would be for an unintended actor (e.g., someone standing in line behind a customer at a kiosk) to replicate the first dynamic QR code.

The first dynamic QR code may comprise, for example, account information, local data, temporary data, etc. That is, the first computing device, e.g., a kiosk, may be configured to generate the first dynamic QR code by compiling account information associated with a user, locally stored data, and/or cloud-based data. Each first QR code frame of the plurality of first QR code frames that make up the first dynamic QR code may comprise a different assortment of such compiled data. This feature provides the benefit of creating user- and/or transaction-specific dynamic QR codes, once again making those QR codes difficult to recreate.

The first frequency may be any preset time interval by which each first QR code frame changes. For example, the first frequency may be set such that a new first QR code frame is displayed every one hundred milliseconds. The first dynamic QR code may be configured such that the plurality of first QR code frames comprising the first dynamic QR code is set on a loop. For example, if a first dynamic QR code is configured based on a total transmission length of 1200 milliseconds, at 1200 milliseconds the final first QR code frame may change back to the first QR code frame initially displayed. Each first QR code frame may comprise one or more different QR sense points in comparison to its immediately preceding first QR code frame. That is, the distance and/or angle ideal for capturing each first QR code frame (as discussed further below with respect to block 310), may be slightly different for each first QR code frame. This feature provides the added benefit of allowing an intended user standing right in front of the first dynamic QR code, to easily capture each first QR code frame; however, any unintended actor attempting to capture the first dynamic QR code from a different angle and/or distance away, would likely not be able to capture the full series of first QR code frames, thereby reducing the unintended actor's chances of capturing the at least one viable first QR code frame, as discussed further below.

The one or more non-viable (or dummy) first QR code frames included in the plurality of first QR code frames are those first QR code frames that are non-functional, i.e., will not successfully authenticate a first user of the first user device, as described further below with respect to block 312. In some embodiments, the system may be configured to track each non-viable first QR code frame that someone attempts to use such that the system, e.g., owed and/or operated by an organization, can track potentially fraudulent activity. The at least one viable first QR code frame included in the plurality of first QR code frames, however, is the only first QR code frame that will successfully authenticate the first user. As discussed above, this feature provides the added benefit of significantly reducing fraudulent transaction activity as an unintended actor would have an impracticable chance of being able to capture the viable first QR code frame out of the plurality of first QR code frames (changing at such a high first frequency), as further described below with respect to block 310.

In block 306, the system (e.g., system 100) may display, by the first computing device, the first dynamic QR code, wherein the at least one viable first QR code frame is displayed at a first time (e.g., 600-700 milliseconds after initially displaying the first frame). In some embodiments, the first computing device may display the first dynamic QR code via a GUI display, for example, on the front of an ATM or kiosk. As discussed above, as each of the first QR code frames of the plurality of first QR code frames changes, the at least one viable first QR code frame may be displayed at a specific moment in time.

In block 308, the system (e.g., system 100) may transmit, by the first computing device, a first pulse to the first user device, wherein the first pulse notifies the first user device to capture the at least one viable first QR code frame. The first pulse may comprise, for example, a wireless connection signal such as a medium-range radio waive wireless signal utilizing 2.4, 5, and/or 6 GHz (e.g., WiFi™ signal), a short-range radio wave wireless signal utilizing 2.4 Gigahertz (GHz) radio frequencies (e.g., a Bluetooth™ signal or a Bluetooth LE™ signal), or an NFC signal, infrared light, a strobe, an audible signal, and/or a non-audible signal (e.g., frequencies below 20 Hz (infrasonic sound) and above 20 kHz (ultrasonic sound)). That is, the first computing device may emit the first pulse to alert the first user device that it should capture the at least one viable first QR code frame, e.g., via an image and/or sound capturing device of the first user device.

In block 310, the system (e.g., system 100) may capture, by the first user device at the first time and in response to receiving the first pulse, the at least one viable first QR code frame. That is, as discussed above, the first user device may, depending on the form of pulse, use its image and/or sound capturing device to capture the at least one viable first QR code at the precise moment in time it is displayed by the first computing device. In some embodiments, the first user device may capture each first QR code frame, including any non-viable frames, as they move through their timed loop, as described above. The first user device may be configured to then, in response to receiving the first pulse, capture the viable first QR code frame and remove the captured non-viable frames from, e.g., any internal memory device. Alternatively, the first user device may identify the viable first QR code frame from all captured first QR code frames based on the time the first user device receives or recognized the first pulse. Put another way, the first user device may identify the viable first QR code frame by finding the QR code that was captured at the same time as the first pulse.

In block 312, the system (e.g., system 100) may authenticate, by the first user device, a first user of the first user device. In some embodiments, authenticating may comprise prompting a first user to log into a mobile application by, for example, entering a username and/or password. Once the first user has logged into the mobile application, the first user may then be further prompted to enter additional identification information (e.g., name, phone number, email address, account information, etc.) such that the system may further authenticate the first user to ensure the first user is correctly associated with the first user device.

Turning to FIG. 3B, in block 314, the system (e.g., system 100) may receive, at the first computing device and from the first user device, a request to complete a transaction. The request may comprise, for example, a transaction type (e.g., obtaining a cashier's check, withdrawing funds, depositing a check, etc.), one or more accounts, a payee, a transaction amount, etc. In some embodiments, the first user may enter the request and any associated information via a GUI of the first user device and may then send the request via the first user device to the first computing device. For example, as discussed above, the first user may already have logged into a mobile application via the first user's mobile device. Within the mobile application, the first user may request the first computing device (e.g. a kiosk) generate a cashier's check for a certain dollar amount.

In block 316, responsive to authenticating the first user of the first user device, the system (e.g., system 100) may generate, by the first user device, a second dynamic QR code comprising a plurality of second QR code frames, wherein each second QR code frame of the plurality of second QR code frames is transmitted at a second frequency, and wherein the plurality of second QR code frames comprises one or more non-viable second QR code frames and at least one viable second QR code frame. The second dynamic QR code may be similar to the first dynamic QR code, as discussed above with respect to block 304, except that the second dynamic QR code is being generated by the first user device instead of the first computing device. For example, once the first user has been authenticated by the system, as discussed above, the first user device may generate its own second dynamic QR code for display on a GUI of the first user device. In some embodiments, the system may instead generate, by the first user device, a static QR code, i.e., one that contains only a single, fixed QR code frame.

In block 318, the system (e.g., system 100) may display, by the first user device, the second dynamic QR code, wherein the at least one viable second QR code frame is displayed at a second time. Displaying the second dynamic QR code may be similar to displaying the first dynamic QR code, as discussed above with respect to block 306, except that the second dynamic QR code is displayed by the first user device instead of the first computing device. For example, the first user device may display the second dynamic QR code via a GUI display of the first user device.

In block 320, the system (e.g., system 100) may transmit, by the first user device, a second pulse to the first computing device, wherein the second pulse notifies the first computing device to capture the at least one viable second QR code frame. Transmitting the second pulse may be similar to transmitting the first pulse, as discussed above with respect to block 308, except that the second pulse is being transmitted by the first user device instead of the first computing device. That is, the first user device may emit the second pulse to alert the first computing device that it should capture the at least one viable second QR code frame, e.g. via an image and/or sound capturing device of the first computing device.

In block 322, the system (e.g., system 100) may capture, by the first computing device at the second time and in response to receiving the second pulse, the at least one viable second QR code frame. Capturing the at least one viable second QR code frame is similar to capturing the at least one viable first QR code frame, as discussed above with respect to block 310, except that the second viable QR code frame is being captured by the first computing device instead of the first user device.

In block 324, the system (e.g., system 100) may, by the first computing device, complete the transaction. For example, the first computing device may generate and issue a cashier's check, may complete a cash deposit, may deposit a check, etc. In the case of generating and issuing a cashier's check, the first computing device may produce the cashier's check (e.g., via a slot on the front of the first computing device) and provide the first user a predetermined amount of time to retrieve the cashier's check. Once the predetermined amount of time has expired, if the first user has not retrieved the cashier's check, the first computing device may retract the cashier's check. This feature provides an added security benefit of helping to ensure an unintended actor does not retrieve the first user's cashier check. In some embodiments, the first computing device may print the cashier's check with a QR code printed on the back of the cashier's check. Once the first user retrieves the cashier's check, the first user may then scan the QR code using an image capturing device of the first computing device (e.g., a QR code scanner). This feature provides an added step of validating that the first user did in fact retrieve the cashier's check.

FIG. 4 shows a flowchart of a method 400 for validating customer interactions. Method 400 may also be performed by computing device 110, financial service provider system 120, and/or user device 130. Method 400 is similar to method 300 of FIGS. 3A-3B except that method 400 also includes blocks 402, 412, and 414. The descriptions of blocks 404, 406, 408, 410, and 416 are the same or similar to the respective descriptions of blocks 304, 306, 308, 314, and 324 of method 300, and as such, are not repeated herein for brevity.

In block 402 of FIG. 4, the system (e.g., system 100) may recognize a first user device. That is, the system may, in response to coming in close vicinity to the first user device, wake up or initiate. This recognition may be due to a wireless connection being established between the system and the first user device, as discussed above with respect to block 302. For example, a first user of the first user device (e.g., a mobile phone) may enter a merchant premises housing the system (e.g., a kiosk). The first user may connect the first user device to a wireless connection associated with the merchant, and to which the system is already connected.

In block 412 of FIG. 4, the system (e.g., system 100) may capture, from the first user device, a second QR code. As discussed above with respect to block 316, the second QR code, displayed by the first user device, may be either a dynamic or static QR code. Thus, the system may be configured to capture the second (dynamic) QR code as discussed above with respect to block 322, or to capture the second (static) QR code via an image (and/or audio) capturing device (e.g., a scanner).

In block 414 of FIG. 4, the system (e.g., system 100) may determine whether the second QR code is authenticated. As discussed above with respect to block 312, a first user associated with the first user device may have already authenticated him or herself by, for example, logging into a mobile application. As discussed above with respect to block 316, the second QR code may have then been generated by the first user device in response to authenticating the first user. The system may thus be configured to recognize that these prior authentication steps have occurred to ensure the second QR code is in fact also authenticated. This feature provides the added benefit of ensuring an unintended actor cannot simply create a random QR code that should not be associated with the first user or the requested transaction.

FIG. 5 shows a flowchart of a method 500 for validating customer interactions. Method 500 may also be performed by computing device 110, financial service provider system 120, and/or user device 130. Method 500 is similar to method 300 of FIGS. 3A-3B. The description of blocks 502, 504, 506, and 508 of method 500 are the same as or similar to the respective descriptions of blocks 310, 314, 316, and 318 of method 300, and as such, are not repeated herein for brevity. Further, the description of block 510 of method 500 is the same as or similar to the combined descriptions of blocks 320, 322, and 324 of method 300, and as such, are not repeated herein for brevity.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to customer devices that may include mobile computing devices. Those skilled in the art will recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Example Use Case

The following example use case describes an example of a typical user flow pattern. It is intended solely for explanatory purposes and not in limitation.

In one example, a user holding a mobile device may walk into a merchant premises to obtain a cashier's check from a kiosk. As the user walks up to the kiosk, a wireless connection may be established between the mobile device and the kiosk. The kiosk, recognizing the presence of the mobile device, may then generate and display a first dynamic QR code. The first dynamic QR code may comprise a plurality of first QR code frames, wherein at least one of the first QR code frames is a viable frame (i.e., the only frame that will work to complete the transaction) while the remaining first QR code frames are non-viable. Each first QR code frame (including both the viable and non-viable frames) may be changing every one hundred milliseconds, such that the user cannot tell the first dynamic QR code is changing. The user may hold the mobile device up to the kiosk to capture the first dynamic QR code with the mobile device's camera. At some moment in time, the kiosk may transmit a pulse of infrared light to alert the mobile device to capture the viable QR code frame at that time. Other people standing inside the merchant premises would likely not be able to capture the viable QR code frame as they would be standing at varying distances and angles from the kiosk, thereby reducing the strength of the sense points contained within the first dynamic QR code. Further, their chances of capturing the viable QR code frame at the required precise moment in time as the user's mobile device recognizes the transmitted pulse would be extremely low.

Once the mobile device captures the viable QR code frame, the mobile device may prompt the user to log into a mobile banking application by entering his or her username and password. Once logged into the mobile banking application, the application may also prompt the user to complete multi-step authentication by entering additional personal or contact information, such as the user's mobile number and/or address. The user may then request the kiosk generate a cashier's check by entering, into the mobile banking application, the requested amount, the payee, and the account from which to pull the funds. The mobile device may then generate and display, via a GUI of the mobile device, a second dynamic QR code that is configured like the first dynamic QR code previously generated and displayed by the kiosk. That is, the second dynamic QR code may comprise a plurality of second QR code frames, wherein at least one of the second QR code frames is a viable frame while the remaining second QR code frames are non-viable, and each second QR code frame is changing every one hundred milliseconds. Once the user sees the second dynamic QR code displayed on the mobile device display, the user may hold the mobile device up to a scanner on the kiosk such that the kiosk may capture the second dynamic QR code. The mobile device may then, at some moment in time, transmit a pulse of infrared light to alert the kiosk to capture the viable QR code frame. Once the kiosk captures the viable QR code frame, the kiosk may then generate the cashier's check. The user may retrieve the cashier's check from a slot on the front of the kiosk. Finally, the user may use the kiosk scanner to scan a QR code printed on the back of the cashier's check, such that the kiosk may confirm the user has the cashier's check in hand.

What is claimed is:

1. A method, comprising:
generating, by a first computing device, a first dynamic Quick Response (QR) code comprising a plurality of first QR code frames, wherein the plurality of first QR code frames comprises one or more non-viable first QR code frames and at least one viable first QR code frame;
transmitting, by the first computing device, a first pulse to a first user device, wherein the first pulse notifies the first user device to capture the at least one viable first QR code frame at a first time;
capturing, by the first user device at the first time and in response to receiving the first pulse, the at least one viable first QR code frame;
authenticating, by the first user device, a first user of the first user device;
receiving, at the first computing device and from the first user device, a request to complete a transaction;
responsive to authenticating the first user of the first user device, generating, by the first user device, a second dynamic QR code comprising a plurality of second QR code frames, wherein the plurality of second QR code frames comprises one or more non-viable second QR code frames and at least one viable second QR code frame;
transmitting, by the first user device, a second pulse to the first computing device, wherein the second pulse notifies the first computing device to capture the at least one viable second QR code frame at a second time;
capturing, by the first computing device at the second time and in response to receiving the second pulse, the at least one viable second QR code frame; and
completing, by the first computing device, the transaction.

2. The method of claim 1, further comprising:
establishing a wireless connection between the first user device and the first computing device.

3. The method of claim 1,
wherein each first QR code frame of the plurality of first QR code frames is transmitted at a first frequency, and
wherein each second QR code frame of the plurality of second QR code frames is transmitted at a second frequency.

4. The method of claim 3, wherein the first frequency and the second frequency comprise a one hundred millisecond time period.

5. The method of claim 1, further comprising:
displaying, by the first computing device, the first dynamic QR code, wherein the at least one viable first QR code frame is displayed at the first time; and
displaying, by the first user device, the second dynamic QR code, wherein the at least one viable second QR code frame is displayed at the second time.

6. The method of claim 1, wherein the first dynamic QR code comprises one or more of account information, local data, temporary data, or combinations thereof.

7. The method of claim 1, wherein the first pulse and the second pulse comprise one or more of a wireless connection signal, infrared light, a strobe, a near-field communication (NFC) signal, a short-range radio wave wireless signal utilizing 2.4 Gigahertz (GHz) radio frequencies, an audible signal, a non-audible signal, or combinations thereof.

8. The method of claim 1, wherein completing the transaction comprises generating a cashier's check comprising a third QR code, and wherein the method further comprises:
capturing, by the first computing device, the third QR code.

9. A system, comprising:
one or more processors; and
a memory in communication with the one or more processors and storing instructions that, when executed by the one or more processors, are configured to cause the system to:
generate a first dynamic Quick Response (QR) code comprising a plurality of first QR code frames, wherein the plurality of first QR code frames comprises one or more non-viable first QR code frames and at least one viable first QR code frame;
transmit a first pulse to a first user device, wherein the first pulse causes the first user device to capture the at least one viable first QR code frame at a first time;

receive, from the first user device, a request to complete a transaction;

capture, from the first user device, a second QR code;

determine whether the second QR code is authenticated; and responsive to determining that the second QR code is authenticated, complete the transaction.

10. The system of claim 9, wherein the instructions are further configured to cause the system to:

display the first dynamic QR code, wherein the at least one viable first QR code frame is displayed at the first time.

11. The system of claim 9, wherein the first dynamic QR code comprises one or more of account information, local data, temporary data, or combinations thereof.

12. The system of claim 9, wherein the first pulse comprises one or more of a wireless connection signal, infrared light, a strobe, a near-field communication (NFC) signal, a short-range radio wave wireless signal utilizing 2.4 Gigahertz (GHz) radio frequencies, an audible signal, a non-audible signal, or combinations thereof.

13. The system of claim 9, wherein the second QR code comprises a second dynamic QR code comprising a plurality of second QR code frames, wherein the plurality of second QR code frames comprises one or more non-viable second QR code frames and at least one viable second QR code frame.

14. The system of claim 9, wherein the request comprises one or more of a transaction type, one or more accounts, a payee, a transaction amount, or combinations thereof.

15. The system of claim 9, wherein completing the transaction comprises generating a cashier's check.

16. A user device, comprising:

one or more processors; and a memory in communication with the one or more processors and storing instructions that, when executed by the one or more processors, are configured to cause the user device to:

capture, from a computing device, a first dynamic Quick Response (QR) code;

transmit, to the computing device, a request to complete a transaction;

generate a second dynamic QR code comprising a plurality of second QR code frames, wherein the plurality of second QR code frames comprises one or more non-viable second QR code frames and at least one viable second QR code frame; and cause the computing device to complete the transaction by transmitting a first pulse to the computing device, wherein the first pulse notifies the computing device to capture the at least one viable second QR code frame at a first time.

17. The user device of claim 16, wherein the first dynamic QR code comprises a plurality of first QR code frames, wherein the plurality of first QR code frames comprises one or more non-viable first QR code frames and at least one viable first QR code frame.

18. The user device of claim 17, wherein each first QR code frame of the plurality of first QR code frames is transmitted at a first frequency, wherein each second QR code frame of the plurality of second QR code frames is transmitted at a second frequency, and wherein the first frequency and the second frequency comprise a one hundred millisecond time period.

19. The user device of claim 16, wherein the instructions are further configured to cause the user device to:

authenticate a user of the user device by receiving one or more of biometric information of the user, a username of the user, a password of the user, or combinations thereof.

20. The user device of claim 16, wherein the first pulse comprises one or more of a wireless connection signal, infrared light, a strobe, a near-field communication (NFC) signal, a short-range radio wave wireless signal utilizing 2.4 Gigahertz (GHz) radio frequencies, an audible signal, a non-audible signal, or combinations thereof.

\* \* \* \* \*